United States Patent [19]

Sliney

[11] 4,136,211
[45] Jan. 23, 1979

[54] METHOD OF MAKING BEARING MATERIALS

[75] Inventor: Harold E. Sliney, Parma, Ohio

[73] Assignee: The United States of America as represented by the Administrator of the National Aeronautics and Space Administration, Washington, D.C.

[21] Appl. No.: 860,406

[22] Filed: Dec. 13, 1977

Related U.S. Application Data

[62] Division of Ser. No. 764,245, Jan. 31, 1977, which is a division of Ser. No. 616,528, Sep. 25, 1975, abandoned, which is a division of Ser. No. 513,611, Oct. 10, 1974, Pat. No. 3,953,343.

[51] Int. Cl.$^2$ .......................... B05D 1/00; B05D 1/08
[52] U.S. Cl. ...................................... 427/34; 252/12.2; 308/78; 308/87 R; 308/168; 308/171; 308/DIG. 8; 308/DIG. 9; 427/292; 427/327; 427/328; 427/355; 427/376 B; 427/376 C
[58] Field of Search ................. 427/34, 292, 327, 328, 427/355, 367, 376 B, 376 C, 423; 252/12, 12.2, 12.4, 12.6; 308/DIG. 8, DIG. 9, 78, 87, 168, 171

[56] References Cited

U.S. PATENT DOCUMENTS

| 3,242,076 | 3/1966 | Hagan | 252/12 X |
|---|---|---|---|
| 3,257,317 | 6/1966 | Bre et al. | 252/12 |
| 3,297,571 | 1/1967 | Bonis | 252/12 |
| 3,370,006 | 2/1968 | Campbell | 252/12 |
| 3,378,392 | 4/1968 | Longo | 427/34 |
| 3,419,363 | 12/1968 | Sliney | 29/182.1 |
| 3,508,955 | 4/1970 | Sliney | 29/182.1 |
| 3,598,635 | 8/1971 | Sagona | 427/34 |
| 3,941,903 | 3/1976 | Tucker, Jr. | 427/190 |
| 3,954,479 | 5/1976 | Jahn | 252/12 X |

Primary Examiner—Michael F. Esposito
Assistant Examiner—Thurmon K. Page
Attorney, Agent, or Firm—N. T. Musial; J. R. Manning; G. E. Shook

[57] ABSTRACT

A method of making composite material which provides low friction surfaces for materials in rolling or sliding contact. The composite material is self-lubricating and oxidation resistant up to and in excess of about 930° C. The composite material is comprised of a metal component which lends strength and elasticity to the structure, a fluoride salt component which provides oxidation protection to the metal but may also enhance the lubrication qualities of the composite.

7 Claims, No Drawings

METHOD OF MAKING BEARING MATERIALS

ORIGIN OF THE INVENTION

The invention described herein was made by an employee of the U.S. Government and may be manufactured and used by or for the Government for governmental purposes without the payment of any royalties thereon or therefor.

RELATED APPLICATIONS

This application is a division of application Ser. No. 764,245, filed Jan. 31, 1977, which is a division of application Ser. No. 616,528, filed Sept. 25, 1975, and now abandoned which is a division of application Ser. No. 513,611, filed Oct. 10, 1974, and now U.S. Pat. No. 3,953,343.

BACKGROUND OF THE INVENTION

1. Field of the Invention

The present invention relates to making composite bearing materials which are self-lubricating and oxidation resistant over a broad temperature range up to and preferably in excess of about 930° C. Composites of this invention are comprised of distinct metallic, glass and fluoride components.

These novel composites may be fabricated by infiltration of a porous, sintered metal with molten glass and fluorides as is well-known in the field of powder metallurgy. Optionally, the constituents of the composite may be co-deposited by plasma-spray techniques on a suitable substrate.

2. Description of the Prior Art

Lubrication of mating surfaces in frictional engagement has long posed problems of wear (e.g., abrasive, adhesive, chemical and fatigue) and overheating of machine parts which subsequently fail prematurely as the manifest result thereof. Typically, oils and greases have been employed to mitigate the deleterious effects of heat and abrasion by virtue of their very low coefficients of friction and relatively long-life properties. However, as technology progressed and thus imposed more severe operating conditions, most notably, higher operating temperatures, it was found that the lubrication properties of fluids were inherently limited, thus ultimately limiting the scope of the advanced design.

In response to the inherent deficiencies of fluid lubricants, solid lubricants emerged as clearly superior in extreme environmental conditions such as high temperatures at which fluids decompose or, on the other hand, extremely low temperatures at which fluids freeze. Additionally, it has been shown that many solid lubricants are extremely effective in chemically active environments which readily decompose fluid lubricants via chemical attack.

Moreover, solid lubricants effect overall savings in many systems insofar as vast weight reduction can be achieved through elimination of pumps, heat exchangers, recirculation systems, and the like, as well as the elimination of seals ofttimes necessary to isolate lubricating and working fluids. Similarly, replenishment of contaminated fluids is vitiated by the use of solid lubricants.

Perhaps the first and most widely employed solid lubricant was graphite. Graphite is formed as a covalently bonded carbon solid of hexagonal structure which may be viewed microscopically as two-dimensional planar molecules occupying basal plane positions, stacked one on top of another and held together by weak, secondary van der Waals forces. The facility with which these "sheets" may readily part along basal planes provides the well-known lubrication qualities of graphite.

However, graphite possesses severe deficiencies as a lubricant in extreme conditions. It has well been demonstrated that the lubricating qualities of graphite are predicated upon its ability to absorb gas, moisture of hydrocarbon vapors before the property of low shear strength is attained. While the gases and water vapor present in a normal atmosphere are usually sufficient to ensure an adequate supply of adsorable material, at high altitudes or under vacuum conditions, for example, desorption occurs with the subsequent loss of lubrication features. Additionally, at temperatures over approximately 95° C., adsorption is significantly decreased with a concomitant decrease in lubrication properties.

To minimize these deficiencies, it has been shown that graphite may be reacted with fluorine gas to yield an improved solid lubricant of the form $CF_x$ where x may vary from approximately 0.3 to 1.1. While this intercalation compound of graphite is capable of providing lubrication without the need of an adsorbed vapor or impurity up to temperatures of approximately 500° C., the chemical reaction must be carefully controlled to yield suitable properties. Then too, oxidation or dissociation at temperatures approaching 500° C. remain persistent problems in graphite systems regardless of the fabrication techniques or chemical alteration thereof.

Similar to graphite are such solid lubricants as molybdenum disulfide and tungsten disulfide which are also hexagonal-layered and whose shear properties are anisotropic, with preferred easy shear parallel to the basal planes of the crystallites. In contradistinction to graphite, neither of this disulfides requires the presence of an adsorbed layer to achieve lubrication properties; however, these disulfides too are temperature limited, albeit at higher temperatures approaching 400° C. where decomposition by oxidation occurs.

Moreover, in highly oxidizing conditions it is well known that the presence of molybdenum greatly contributes to the catastrophic oxidation of many engineering alloys. This catastropic or accelerated oxidation results as molybdenum oxidizes to $MoO_3$ at temperatures greater than 400° C. This oxide of molybdenum will melt at approximately 795° C., and it has been suggested that this low-melting oxide phase may then act as an flux to dislodge or dissolve protective films. Additionally, eutectic combinations of the molybdenum oxide and other oxides present will further reduce the melting point, thus aggravating the structural degradation attendant this high temperature oxidation.

While the effectiveness of the above-noted layer-lattice lubricants may be greatly enhanced through resin bonding techniques, severe limitations are yet presented as temperaturs increase within the range of interest. Still too the problem of catastrophic oxidation are not overcome by such resin bonding of the lubricant.

The breakthrough in high temperature lubrication came with the discovery that various fluorides provide low friction surfaces under extremes of temperature and ambient chemical environment. Note, for example, U.S. Pat. Nos. 3,157,529, 3,419,363 and 3,508,955 each to H. E. Sliney and assigned to the National Aeronautics and Space Administration. Each of these patents relates generally to solid lubricants comprised of, interalia, fluorides.

More particularly, U.S. Pat. No. 3,157,529 discloses fluoride lubricant coatings applied as a film to the surface to be lubricated, which coatings are basically comprised of calcium fluoride and a suitable ceramic binder therefor. While such techniques have proved extremely effective in the field of high-temperature solid-lubricant coatings, the useful life of such coatings is limited. When the coating eventually is worn away, the lubricant cannot be readily replenished and lubrication ceases. A method whereby solid lubricant is replenished as wear takes place is clearly desirable. Self-lubricating composites are an approach to accomplish this replenishment.

To reduce the problems of film-type solid lubricants, composite bearing materials containing fluoride lubricants were subsequently developed by Sliney. For example, U.S. Pat. No. 3,419,363 discloses such a composite comprised of a porous metal impregnated with Group I or Group II metallic fluorides with the eutectic composition of barium fluoride and calcium fluoride as the preferred lubricant. However, such composites have posed new problems insofar as the porous metal component provides greatly increased surface area as opposed to that of solid substrates. Accordingly, high temperature oxidation of these porous, sintered metals poses significant problems at temperatures exceeding 700° C.

Accordingly, a need exists for improved high-temperature, self-lubricating materials which exhibit the excellent lubricating qualities of fluoride-containing composites and yet are not susceptible to high temperature oxidation. The need for such materials is presently becoming critical in advanced aircraft where aerodynamic heating at speeds of Mach 3 and higher can result in vehicle skin temperatures well above the temperature limitations of presently available air frame bearings. As an extreme case, it is predicted that the maximum skin temperature for the Space Shuttle Orbitor during re-entry will approach or exceed 1100° C. Air frame bearings and control surface seals for the orbitor proximate these heated surfaces must be capable of high temperature operation without degradation. Other areas in which high temperature lubrication has become increasingly more important include sliding contact seals for automotive turbine regenerators, shaft seals for turbo pumps, piston rings for high performance reciprocating compressors, hot glass processing machinery, and the like.

SUMMARY OF THE INVENTION

To obviate the deficiencies in the prior art, it is the primary object of this invention to provide an improved method of making self-lubricating bearing materials which are oxidation-resistant up to and preferably in excess of about 930° C.

It is also an object of this invention to provide self-lubricating, oxidation-resistant bearing materials comprised of a heat-resistant metal component, an oxidation-inhibiting glass component and a lubricating fluoride component.

It is yet another object of the invention to provide these self-lubricating, oxidation-resistant bearing materials fabricated by plasma-spray co-deposition of the metal, glass and fluoride components.

It is still a further object of this invention to provide a method of fabricating self-lubricating, oxidation-resistant bearing materials which are durable and yield plastically under unit loads of at least MN/m$^2$ at temperatures up to and in excess of about 930° C.

It is another object of this invention to fabricate self-lubricating, oxidation-resistant bearing materials simply, yet efficiently, and at low cost.

Further objects of this invention will become apparent to those skilled in the art from examination of the following detailed description of the invention.

It has now been determined in accordance with this invention that low friction surfaces exhibiting self-lubrication and oxidation resistance up to and in excess of about 930° C. may be formed as a composite of a metallic constituent which lends strength and elasticity to the structure, a glass component which provides oxidation protection to the metal and may also contribute to reduced wear and finally, a fluoride component which provides lubrication. The composite of this invention may be fabricated as a porous, sintered metallic matrix which is infiltrated with molten glass and fluoride or, optionally, a suitable substrate with metal, glass, and fluoride components co-deposited thereon by plasma-spray techniques. The lubricating material of the present invention will effectively preclude galling from room temperature to and in excess of 930° C., but is particularly effective over the range 530°–930° C. at which temperature the glass and particularly the fluorides are soft enough to form a smear or glaze of lubricating film on the surface. These novel composites are easily machined and exhibit plastic response over the temperature range of interest.

DETAILED DESCRIPTION OF THE PREFERRED EMBODIMENT OF THE INVENTION

The principle of operation of the self-lubricating, oxidation-resistant composite of the invention rests upon the ability of the metallic content of the composite to provide strength and elasticity to the structure; the glass will provide oxidation-protection to the metal and may additionally enhance the lubrication quality of the fluoride component. During the sliding process, any wear that takes place exposes more fluoride lubricant thereby preventing an increase in wear rate or galling of the surfaces. The lubricating material will effectively prevent galling from room temperature to at least 930° C., but it is particularly effective from 530° to 930° C. at which temperature the glass and particularly the fluorides are soft enough to form a smear or glaze of lubricating film on the surface.

As noted above, the function of the metallic component is to provide structural strength to the instant composites over the temperature range of interest and under bearing loads which oftentimes exceed unit stresses of approximately 35 MN/m$^2$. Accordingly, this metal component may be selected from any of the well known high temperature alloys, and most notably alloys of iron, cobalt or nickel. Specific examples of such high temperature alloys which may be used to fabricate the composites of the instant invention are: for iron — austenitic and ferritic stainless steels, for example; for cobalt — super-alloys containing significant chromium such as H.S.6B, H.S. 21, and H.S.25, and for nickel — super-alloys such as the inconels, nichromes, Rene 41, and the like. Numerous other high temperature alloys are equally well suited to provide the necessary structural strength at the temperatures of interest and are familiar to those skilled in the art. However, it has been determined that the metal component of the composite is preferably a high nickel or cobalt alloy, i.e., one containing greater than 50% nickel or cobalt, with significant chromium content, i.e., greater than 10%. Most preferred is an 80% nickel, 20% chromium alloy.

Optionally, the metallic component of the composite may contain silver, gold or alloys thereof, it being understood that the optional silver additions limit the maximum serviceable temperature to about 820° C. as the result of a melting point of about 850° C. for this component. Such additions will improve the low temperature lubricating characteristics of the composite thereby expanding their effective operating range. While these silver and/or gold additions may be present from 0 to 50% by weight, it will be appreciated that the time-temperature profile for the composite bearing material will necessarily predicate the amounts of these components, particularly the relatively low melting silver. Accordingly, bearings which are put into prolonged, high-temperature service, i.e., more than approximately 90% of their operating time at temperatures in excess of approximately 500° C. need incorporate only minor percentages of precious metal components such as 0 to 10%. Contrariwise, bearings expected to be subjected to short-lived, rapid fluctuations up to high temperatures of approximately 900° C. but typically operated within an ambient temperature range of about room temperature to 500° C. may incorporate significant percentages of these silver and/or gold additions, i.e., 10 to 50%. Accordingly, it can readily be seen that the instant composites may be tailored to meet numerous design criteria.

Turning now to the fluoride component of the self-lubricating composites, it will be appreciated that numerous fluoride salts may be employed to achieve the desired lubrication features. Illustrative of such fluoride salts are those of Group I and Group II metals of the Periodic Table of Elements as well as fluorides of rare earth (lanthanide series) metals of the Periodic Table of Elements. Preferred for providing the lubricating qualities of the composites of this invention are eutectic mixtures of the foregoing fluorides. Also preferred are the fluorides of calcium and barium, while most preferred is the eutectic composition of calcium fluoride and barium fluoride.

With regard to the glass component of the topic composites, it has been determined to be highly beneficial to employ a silicate glass [i.e., a glass containing from 55% to 80% silica] which is high in concentration, [i.e., at least about 20% by weight] of oxides of divalent ions of Group II metals, especially $Ba^{++}$, and low [i.e., less than about 10% by weight] in oxides of monovalent ions of Group I metals such as an $Na^+$. That is, it is most beneficial to employ Group II silicate network modifiers in preference to the more conventionally employed Group I modifiers found typically in commercial glasses such as the common soda-glasses. Such a constraint may be explained, at least in part, by the observation that glasses low in $Na^+$ content have an atomic arrangement which is less favorable for diffusion of transition metal ions such as $Fe^{++}$, $Co^{++}$, $Ni^{++}$, and $Cr^{+++}$. Accordingly, these low sodium ion glasses will provide better protection of the metallic constituents of the composite against oxidation reactions such as these which are diffusion-rate controlled.

A preferred glass composition within the scope of the instant invention is comprised of 10 to 50% BaO; 0 to 30% $Na_2O$ and/or $K_2O$; 0 to 15% CaO, and, balance $SiO_2$. While it has been determined that glasses falling within the foregoing preferred compositional limits will effectively inhibit oxidation of the metallic component of the composite, the most preferred glass composition is one comprised of 20% BaO, 10% $K_2O$, 10% CaO, 60% $SiO_2$.

Having thus described the individual components of the topic self-lubricating, oxidation-resistant composites of the present invention, it will be appreciated that each of the metal, fluoride, and glass components may be present in varying amounts. For example, in view of the fact that the metallic component of the composite is fundamentally present to provide structural integrity, bearing surfaces subjected to fairly low loads, i.e., 7 $MN/m^2$ or less, may function adequately with a metallic content of from 20 to 40% relative to the weight of the entire composite. Contrariwise, bearing surfaces subjected to high unit loads, i.e., loads above 35 $MN/m^2$ may require as much as 80% metallic constituent to provide the necessary structural strength. Accordingly, the skilled artisan may incorporate the metallic component in amounts ranging from 20 to 80% depending upon the design criteria of the desired application. Similarly, depending upon the degree of oxidation-inhibition desired when viewed against the oxidizing nature of both the ambient environment and metal component selected, the combined glass and fluoride salt content may be present within the range of 20 to 80%.

With regard to this combined fluoride salt glass content, the fluoride-to-glass ratio may extend from 1:2 to 2:1. Should the ambient surroundings of the composite bearing material by highly oxidizing, there may be provided up to two-thirds oxide-inhibiting glass relative to the fluoride salt content while less oxidizing atmospheres may allow for as low as one-third glass content relative to the fluoride component of the composite. However, under most circumstances, the most preferred ratio between fluoride salt content and glass content is 1:1.

Accordingly, in view of the foregoing, self-lubricating, oxidation-resistant bearing composites may be comprised of from 20 to 80% high-temperature resistant metallic component; 0 to 50% silver, gold or alloys thereof; and, 20 to 80% combined lubricating fluorides and oxide-inhibiting glass. A preferred composition comprises 60 to 70% of a metallic constituent selected from the group of high temperature iron, cobalt, and nickel alloys; 15 to 20% of a lubricating fluoride salt selected from the group of calcium fluoride, barium fluoride and mixtures thereof; and, 15 to 20% of a glass comprised of from 10 to 50 barium oxide, 0 to 30% sodium oxide and/or potassium oxide, 0 to 15% calcium oxide and balance silica.

A most preferred composite according to the present invention is comprised of 67% of an 80 nickel, 20 chrome alloy, 16½% of barium fluoride-calcium fluoride eutectic, and 16½% of a glass comprised of 20% BaO, 10% $K_2O$, 10% CaO, and 60% $SiO_2$. In the case of plasma-sprayed composites, the fluoride eutectic may be replaced with the single fluoride, $CaF_2$.

Having thus described the materials which may be employed to fabricate the composites of the present invention as well as clearly setting forth the most preferred composition, the present invention will be described with reference to the following fabrication technique for the subject bearing material.

Plasma Spray Codeposition

The preferred fabrication technique of the present invention invisions the formation of the self-lubricating composite from plasma sprayed metal-glass-fluoride powders. Numerous important advantages are attained from employing plasma-arc spray techniques as opposed to the aforementioned infiltration of porous sintered bodies. Most notably, the plasma-spray codeposition of the various constituents of this composite directly upon the supporting substrate precludes the necessity of the additional process step of brazing or otherwise attaching the lubricating composite to the desired surface. With respect to this additional step of brazing, etc. which typically requires heating the substrate into a temperature range possibly harmful to the metallurgical properties thereof, the plasma-spray technique need not heat the substrate over approximately 150° C. thus preserving the effects of any prior heat treatment, reducing the possibility of alloy segregation, etc. Additionally, the plasma-spray technique is simpler, more economical and faster than impregnation of porous, sintered metal workpieces.

In carrying out the plasma-spray method, glass frit is prepared in any manner well known to those skilled in the art: e.g., ball milling a suitable glass composition. The glass frit is sized to particles of 125 microns and is thence mixed with the desired metal powder and fluoride lubricant powder.

The underlying substrate surface upon which the bearing composite is to be codeposited should be grit blasted or otherwise cleaned to remove surface films, foreign materials and the like. The composites may then be sprayed to a thickness from 0.010 centimeters to 0.060 centimeters and subsequently machined back to a working thickness of from approximately 0.005 centimeters to approximately 0.050 centimeters.

Techniques employed for such plasma-arc codeposition are well known in the prior art. Note, for example, U.S. Pat. Nos. 3,540,942 and 3,640,755, each of which deals with conceptually similar techniques for the plasma-arc spraying of metallic materials. More particularly, note NASA Technical Memorandum TMX-71432, "Plasma-Sprayed Metal-Glass and Metal-Glass Fluoride Coatings for Lubrication to 900° C." by H. E. Sliney, incorporated herein by reference, and relied upon. It will be appreciated, however, that other metal-spray techniques may likewise be employed to achieve the codeposition of the metal-glass-fluoride constituents of the topic composites. Such other techniques, as are obvious to those skilled in the art, include, for example, flame-spray and electric-arc spray such as set forth in *Manufacturing Processes and Materials for Engineers*, Doyle et al., 2nd Edition, Prentice Hall, New Jersey, 1961, pages 376–378.

Regardless of the fabrication technique selected from those mentioned above, the composite bearing materials of this invention may be surface enriched in the lubricant by a thin fluoride spray film as previously described or by subsequent heat treatment in air at from 760° C. to 900° C. for 4 to 24 hours. Such a heat treatment will cause slight exudation and solid state migration of fluorides along the surface and further serves the beneficial purpose of mildly pre-oxidizing the exposed metal. Additionally, the surfaces will become entirely covered with a combined fluoride-oxide film which is highly desirable to prevent direct metal-to-metal adhesive contact during sliding.

Additionally, it should be noted that the self-lubricating, oxidation-resistant composites of this invention are easily machinable and may be put into service as machined, as honed, or finished with abrasive paper. Under bearing loads of 35 MN/m$^2$ or greater and at temperatures up to at least 930° C. these composites will yield plasticly thus precluding failures due to brittle fracture and reducing fatique tendencies attendent high-cycle operation typical of bearing applications.

To further illustrate the objects and advantages of the present invention, the following specific examples will be given, it being understood that same are intended to be merely illustrative and in no wise limitative.

EXAMPLE 1

60 grams of Haynes Stellite 6B powder and 10 grams of silver, each of −125 mesh, are combined with 15 grams of glass frit of 125 microns prepared by ball milling 20% barium oxide, 10% potassium oxide, 10% calcium oxide and 60% silicon oxide; and, 15 grams of calcium fluoride — barium fluoride eutectic powder. This mixture is plasma-arc sprayed on an AISI 440c stainless substrate which is prepared by grit blasting to remove any foreign matter. The metal, glass and fluoride composite is co-deposited to a thickness of 0.050 centimeters and allowed to cool. The composite is then honed to a thickness of 0.025 centimeters and is ready for service.

EXAMPLES 2–7

Examples 2–7 are prepared in the same manner as that given for Example 1 and are composed of those materials outlined in Table 2, which materials are selected from those set forth in Table 1.

TABLE 1

| Metal: | A<br>AISI 310 | B<br>AISI 330 | C<br>H.S. 6B | D<br>Hastelloy<br>G | E<br>80% Ni:<br>20% Cr |
|---|---|---|---|---|---|
| Glass: | | | | | |
| BaO | 10 | 15 | 20 | 25 | 30 |
| Na$_2$O | — | — | — | — | 5 |
| K$_2$O | — | — | 10 | 5 | 5 |
| CaO | 10 | 10 | 10 | 5 | 0 |
| SiO$_2$ | 80 | 75 | 60 | 65 | 60 |
| Fluorides: | | | | | |
| CaF$_2$ | 100 | — | 50* | 50 | 50 |
| BaF$_2$ | — | 100 | 50 | — | — |
| MgF$_2$ | — | — | — | — | — |
| LiF | — | — | — | — | 50 |
| SrF$_2$ | — | — | — | 50 | — |

*eutectic

TABLE 2

| Example | Metal | Glass | Fluoride |
|---|---|---|---|
| 1 | 60% C + 10% Ag | 15% C | 15% C |
| 2 | 30% E + 30% Ag | 15% C | 25% A |
| 3 | 30% C + 30% Ag | 15% C | 25% A |
| 4 | 67% E | 16⅔% C | 16⅔% A |
| 5 | 70% A | 20% D | 10% C |
| 6 | 40% D | 20% B | 40% B |
| 7 | 80% E | 20% E | 0 |

While the invention has been described and illustrated with reference to certain preferred embodiments thereof, those skilled in the art will appreciate that various modifications, changes, omissions and substitutions may be made without departing from the spirit of the invention. It is intended, therefore, that the invention be limited only by the scope of the following claims.

What is claimed is:

1. A method for fabricating a self-lubricating, oxidation-resistant article comprising the steps of forming a frit of a glass capable of inhibiting oxidation in a metal capable of providing strength and elasticity to a temperature up to and in excess of about 930° C., mixing said glass frit with powders of said metal and powders of a fluoride salt capable of providing lubrication thereby forming a composition of matter, co-depositing the mixture of said metal, said fluoride salt and said glass on a substrate by means of plasma-arc spraying to form a coating having a thickness from about 0.010 centimeter to about 0.060 centimeter, and machining said coating to a thickness between about 0.005 centimeter and about 0.050 centimeter.

2. A method for fabricating a self-lubricating, oxidation-resistant article as claimed in claim 1, further comprising heat treating said deposit-containing substrate at a temperature of from about 760° C. to 900° C. for a period of from about 4 to 24 hours.

3. A method for fabricating a self-lubricating, oxidation-resistant article as claimed in claim 1, wherein said article comprises:

(a) 20%–80% of an alloy consisting essentially of 80% Ni and 20% Cr;
(b) 10% to 40% of $CaF_2$;
(c) 10% to 40% of a glass consisting essentially of 20% BaO, 10% $K_2O$, 10% CaO and 60% $SiO_2$; and
(d) 0–50% Ag, Au or alloys thereof.

4. A method for fabricating a self-lubricating, oxidation-resistant article as claimed in claim 1, wherein said article comprises:

(a) 67% of an alloy consisting essentially of 80% Ni and 20% Cr;
(b) $16\frac{1}{2}$% of $CaF_2$; and
(c) $16\frac{1}{2}$% of a glass consisting essentially of 20% BaO, 10% $K_2O$, 10% CaO and 60% $SiO_2$.

5. A method for fabricating a self-lubricating, oxidation-resistant article as claimed in claim 1 wherein the glass frit is formed by ball milling.

6. A method for fabricating a self-lubricating, oxidation-resistant article as claimed in claim 1 wherein the glass frit is sized to particles of 125 microns.

7. A method for fabricating a self-lubricating, oxidation-resistant article as claimed in claim 1 including the step of grit blasting the surface of said substrate prior to co-depositing the glass, metal and lubricant.

* * * * *